United States Patent
Shpak

(10) Patent No.: US 11,765,678 B2
(45) Date of Patent: Sep. 19, 2023

(54) SYSTEM AND METHOD FOR DISTRIBUTED SENSOR SYSTEM FOR OBJECT LOCATIONING

(71) Applicant: Deeyook Location Technologies Ltd., Tel Aviv (IL)

(72) Inventor: Eran Shpak, Tel Aviv (IL)

(73) Assignee: DEEYOOK LOCATION TECHNOLOGIES LTD., Tel Aviv (IL)

( * ) Notice: Subject to any disclaimer, the term of this patent is extended or adjusted under 35 U.S.C. 154(b) by 198 days.

(21) Appl. No.: 17/523,554

(22) Filed: Nov. 10, 2021

(65) Prior Publication Data

US 2023/0147725 A1 May 11, 2023

(51) Int. Cl.
*H04W 64/00* (2009.01)
*G01S 5/04* (2006.01)

(52) U.S. Cl.
CPC ............. *H04W 64/00* (2013.01); *G01S 5/04* (2013.01)

(58) Field of Classification Search
None
See application file for complete search history.

(56) References Cited

U.S. PATENT DOCUMENTS

| | | | |
|---|---|---|---|
| 9,020,523 B2 | 4/2015 | Moeglein et al. | |
| 9,814,051 B1 | 11/2017 | Shpak | |
| 10,182,315 B2 | 1/2019 | Shpak | |
| 2016/0291124 A1* | 10/2016 | Bauer | H04W 64/00 |
| 2018/0295601 A1 | 10/2018 | Wang et al. | |
| 2020/0145955 A1 | 5/2020 | Opshaug et al. | |
| 2020/0326405 A1 | 10/2020 | Silverman et al. | |
| 2020/0359355 A1 | 11/2020 | Zhang et al. | |
| 2021/0105579 A1 | 4/2021 | Akkarakaran et al. | |

OTHER PUBLICATIONS

International Search Report dated Mar. 30, 2023 for PCT Appn. No. PCT/IB2022/060847 filed Nov. 10, 2022, 24 pgs.

* cited by examiner

*Primary Examiner* — Suhail Khan
(74) *Attorney, Agent, or Firm* — Brooks Kushman P.C.

(57) ABSTRACT

An apparatus for generating a mosaic for a wireless communication system. The apparatus includes memory and a server. The server is programmed to receive first information from an associated access point that is indicative of a first receiver time stamp and a second receiver time stamp. The server is further programmed to determine a first difference between the first receiver time stamp and the second receiver time stamp to generate a first difference value and to receive second information that is indicative of a third receiver time stamp and a fourth receiver time stamp. The server is further programmed to determine a second difference and to generate a second difference value. The server is further programmed to determine that packets as transmitted by the mobile device are the same based on the first difference value and the second difference value being within a predetermined receiver time error range.

20 Claims, 9 Drawing Sheets

SYSTEM AND METHOD FOR DISTRIBUTED SENSOR SYSTEM FOR OBJECT LOCATIONING

TECHNICAL FIELD

Aspects disclosed herein generally relate to a system, apparatus, and/or method for providing a distributed sensor system for object locationing.

BACKGROUND

U.S. Pat. No. 10,182,315 to Shpak (hereafter the '315 patent) discloses a method for signal processing that includes receiving at a given location, at least first and second signals transmitted, respectively, from at least first and second antennas of a wireless transmitter. The at least first and second signals encode identical data using a multi-carrier encoding scheme with a predefined cyclic delay between the transmitted signals. The received first and second signals are processed, using the cyclic delay, in order to derive a measure of a phase delay between the first and second signals. Based on the measure of the phase delay, an angle of departure of the first and second signals from the wireless access point to the given location is estimated.

U.S. Pat. No. 9,814,051 also to Shpak (hereafter the '051 patent) discloses a method for signal processing. The method provides, among other things, receiving at a given location at least first and second signals transmitted, respectively, from at least first and second antennas of a wireless transmitter, the at least first and second signals encoding identical data using a multi-carrier encoding scheme with a predefined cyclic delay between the transmitted signals and processing the received first and second signals, using the cyclic delay, in order to derive a measure of a phase delay between the first and second signals. Based on the measure of the phase delay, the method provides estimating an angle of departure of the first and second signals from the wireless transmitter to the given location.

SUMMARY

In at least one embodiment, an apparatus for generating a mosaic for a wireless communication system is provided. The apparatus includes memory and a server. The server includes the memory and is programmed to receive first information from an associated access point that is indicative of: (i) a first receiver time stamp that the associated access point received a first packet from a mobile device, and (ii) a second receiver time stamp that the associated access point received a second packet from a first access point. The server is further programmed to determine a first difference between the first receiver time stamp and the second receiver time stamp to generate a first difference value and to receive second information from a first location receiver that is indicative of (i) a third receiver time stamp that the first location receiver received a third packet from the mobile device, and (ii) a fourth receiver time stamp that the first location receiver received the second packet from the first access point. The server is further programmed to determine a second difference between the third receiver time stamp and the fourth receiver time stamp to generate a second difference value and to compare each of the first difference value and the second difference value to a predetermined receiver time error range. The server is further programmed to determine that the first packet and the third packet as transmitted by the mobile device are the same in response to each of the first difference value and the second difference value being within the predetermined receiver time error range.

In at least another embodiment, an apparatus for generating a mosaic for a wireless communication system is provided. The apparatus includes memory and a server. The server includes the memory and is programmed to receive first information from an associated access point that corresponds to an acknowledgment packet as received from a mobile device. The acknowledgment packet is transmitted by the mobile device in response to a data packet that is transmitted by the associated access point and the first information further corresponding to a receiver address field in the data packet that provides an identification of the mobile device for the associated access point to transmit the data packet thereto. The server is further programmed to access the receiver address field to determine the identity of the mobile device after the acknowledgment packet is received from the mobile device at the associated access point.

In at least another embodiment, a method for generating a mosaic for a wireless communication system is provided. The method includes receiving, at a server, first information from an associated access point that is indicative of: (i) a first receiver time stamp that the associated access point received a first packet from a mobile device, and (ii) a second receiver time stamp that the associated access point received a second packet from a first access point. The method includes determining a first difference between the first receiver time stamp and the second receiver time stamp to generate a first difference value. The method further includes receiving second information from a first location receiver that is indicative of (i) a third receiver time stamp that the first location receiver received a third packet from the mobile device, and (ii) a fourth receiver time stamp that the first location receiver received the second packet from the first access point. The method further includes determining a second difference between the third receiver time stamp and the fourth receiver time stamp to generate a second difference value. The method further includes comparing each of the first difference value and the second difference value to a predetermined receiver time error range and determining that the first packet and the third packet as transmitted by the mobile device are the same in response to each of the first difference value and the second difference value being within the predetermined receiver time error range.

In at least another embodiment, a method for generating a mosaic for a wireless communication system is provided. The method includes receiving, at a first server, first information from an associated access point that corresponds to an acknowledgment packet as received from a mobile device. The acknowledgment packet being transmitted by the mobile device in response to a data packet that is transmitted by the associated access point and the first information further corresponding to a receiver address field in the data packet that provides an identification of the mobile device for the associated access point to transmit the data packet thereto. The method further includes accessing the receiver address field to determine the identity of the mobile device after the acknowledgment packet is received from the mobile device at the associated access point.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompany drawings in which:

DETAILED DESCRIPTION

Figure 1:
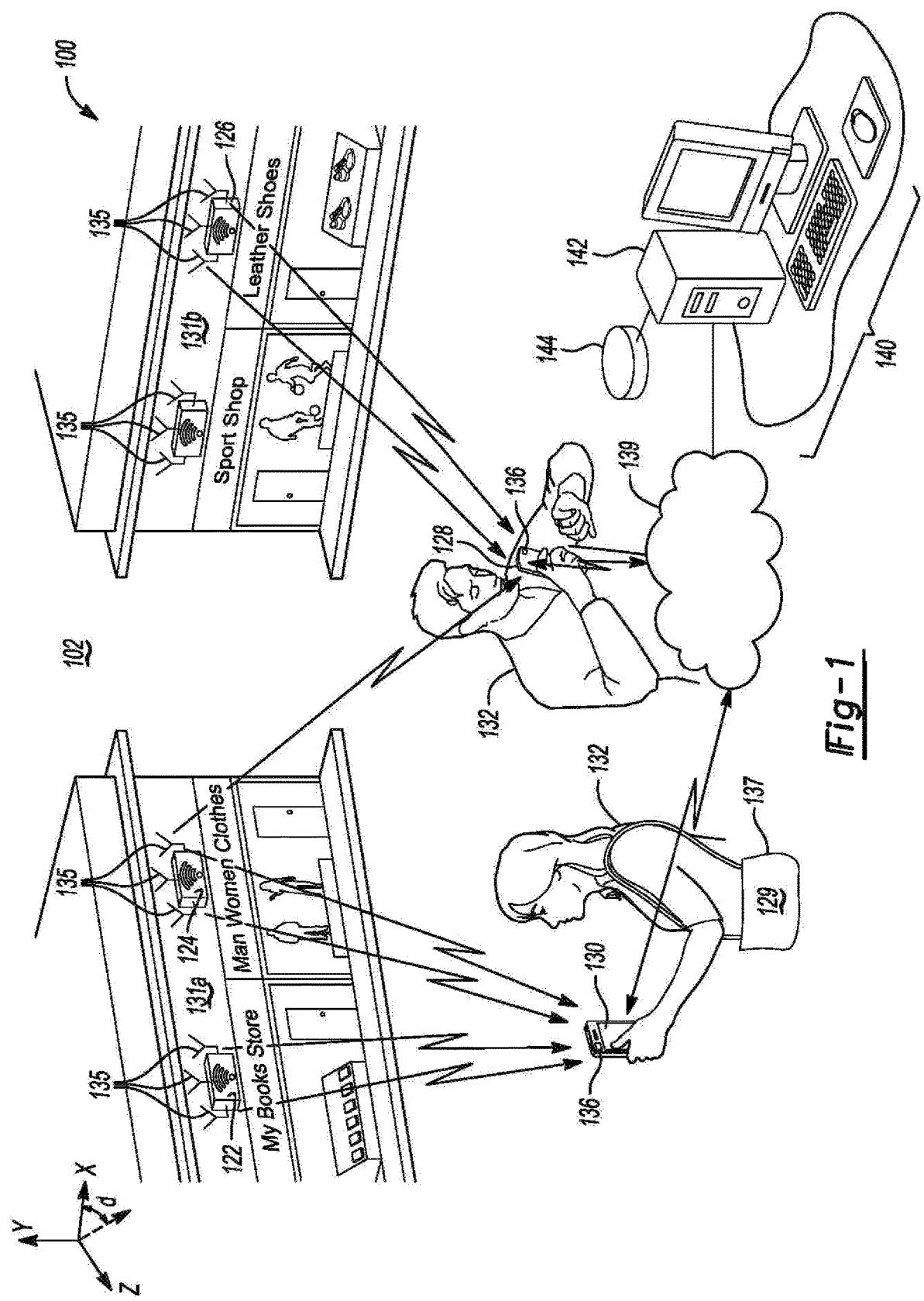
FIG. 1 is schematic, pictorial illustration of a system for wireless location finding, in accordance with an embodiment.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

It is recognized that at least one controller (or at least one processor) as disclosed herein may include various microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof), and software which co-act with one another to perform operation(s) disclosed herein. In addition, the at least one controller as disclosed herein utilize one or more microprocessors to execute a computer-program that is embodied in a non-transitory computer readable medium that is programmed to perform any number of the functions as disclosed. Further, the controller(s) as provided herein includes a housing and the various number of microprocessors, integrated circuits, and memory devices ((e.g., FLASH, random access memory (RAM), read only memory (ROM), electrically programmable read only memory (EPROM), electrically erasable programmable read only memory (EEPROM)) positioned within the housing. The disclosed controller(s) also include hardware-based inputs and outputs for receiving and transmitting data, respectively from and to other hardware-based devices as discussed herein.

A collection system of packet wireless communications is required to passively ascertain the location of mobile transceivers ("devices"). The devices are communicating with an associated access point ('AP') to bridge their traffic to and from the Internet. With the advances in wireless communication schemes, the transmissions are adapted and tailored to instantaneous link conditions thereby rendering collection from arbitrary locations challenging and lacking in content due to the inopportune position of the receivers. For example, a modulation scheme of 1024-Quadrature Amplitude Modulation ("QAM") is selected only if the device decides the current link conditions against the receiving AP are pristine. This may likely render reception from a less opportune position unintelligible. For this reason, passive wireless sniffers are becoming less popular with advances in modem technology; passive sniffers become unreliable since the sniffer is counted out of an active adaptation process. Diversity in receiver positions is a key factor to the collection of position sensitive data, for example, for the purpose of triangulation. Hence, the inherent challenge is passive wireless locationing.

The solution which will be set forth below, includes, but not limited to, rebuilding a mosaic of small pieces of information gleaned from a plurality of receivers and the associated access point into a coherent location estimation. Objects may be observed by a plurality of sensors in space-time on a single inertial frame of reference. A mosaic of individual sensor readings over time may reveal the location of an object in a desired space-time frame of reference. Individual sensors may be keyhole observes, each can see only a segment of space. Effective observation may be achieved if different keyhole observations are fused into the bigger picture of reality. Observations are not well synchronized, observers being distributed in space-time. Further, different sensors are differently abled, for example, location receivers can read Angle of Arrival, register time stamp events using a local clock but not decode the content of packets other their PHY headers. The associated access point can decode the content of packets, including their PHY and MAC layers, and register time stamp events but not necessarily read Angle of Arrival. Reconstruction of reality may be possible by somehow piecing the observations together. Both perspective of time and spatial perspective are required.

The disclosed embodiments may provide for the ability to uniquely and globally label individual events in time, logged at different locations in space and time to construct a global understanding of the event that may not be possible otherwise, for example, by a single "key-hole" observer. Each event log is chronological i.e., from local points of view is identically ordered, first is first, second is second and so forth. For example, local Super-Nova event using gamma ray sensors spread across the globe. The sensors may be using autonomous clocks. Once the individual explosion event is identified, for example, NGC 2770 on Feb. 2, 2015 at various sensor locations, the big pictures reveals secrets that are not decipherable using individual readings, for example, the location of the super nova in the sky can be extracted by triangulation (e.g., using the parallax effect) only if readings of the same event are taken from different angles, spreading out sensor locations and identifying events (e.g., NGC 2770) in multiple distributed event logs.

By another analogy, solving a crime using multiple event logs of different witnesses that are loosely synchronized in time, one witness heard two shoots, three seconds apart from his/her apartment, another saw a flash of light walking the street, and a third observer at the balcony saw a person running one minute after seeing a flash. Since the observers are on the same inertial frame of reference, time difference between two distinct events seen by the two observers is almost identical (e.g., identical in a Newtonian world, time drifting in Einstein's world). Thus, the embodiments below provide a system that enables rebuilding a mosaic based on information gleaned from receivers to provide a coherent location estimation.

In another example, a set of wireless receivers analyze an individual packet transmission at different locations. The location and identity of the transmitter can be analyzed only if this individual packet transmission is uniquely and globally tagged (e.g., as NGC2770 in a previous example). In practice, some sensors can extract the received angle of arrival but not the identity, others can extract the transmitter identity, another (for example, a single antenna location receiver) can extract the time of arrival of an anonymous transmission but not the identity, nor the angle of arrival, requiring more than a single antenna.

Mobile WiFi devices communicate with access point(s) and such WiFi devices are associated with the access points which is their gateway to the internet. Mobile devices may be associated with only one access point at a time, if at all. When transmitting data packets, the mobile device rate adapts packet transmission utilizing different modulation schemes such as Quadrature Phase Shift Keying (QPSK), 16 Quadrature Amplitude Modulation (QAM) (or "16QAM"), etc. and beam form, so that the associated access point in particular, may reliably receive these packets, including a Media Access Control (MAC) address (comprising the identity) of the mobile device. If the access point fails to receive a packet, it avoids acknowledging the receipt of the packets so that mobile device would resend the packet. This mechanism is referred to as Automatic Repeat Request ("ARQ"), and such a retransmission may assure reliable and complete transmission of messages. However, this mechanism is by design, point-to-point between the mobile device and the associated access point. Receivers other than the associated access point may not be protected by the ARQ mechanism or may be out of beam. In addition, other receivers may have too few antennas to decode a Multiple Input Multiple Output (MIMO) messages and hence may not receive the mobile MAC address either because of errors (e.g., without transmission) or because the rate is too high for the receivers to receive, given the particular link conditions. With the introduction of MIMO, the ARQ and rate adaption make link conditions more point to point in nature. Similarly, data may be received in very specific multipath conditions, which is very sensitive to the location of the transmitter, the receiver and reflecting objects illuminated by the transmitter or receiver. Hence, many location receivers may only receive the PHY header which is robust by design but not the transmitter address.

FIG. 1 is schematic, pictorial illustration of a system 100 for wireless communications and position finding, in accordance with an embodiment of the invention. By way of example, FIG. 1 shows a typical environment, such as a shopping mall or street, in which multiple access points 122, 124, 126 (or transmitters 122, 124, 126) are deployed, often by different WLAN proprietors independently of one another. It is recognized that the number of access points 122, 124, 126 may vary and are stationary. The access point 122 may be defined as an associated access point. The associated access point is an entity that is selected by a mobile device 128, that bridge all traffic with a distributed (or distribution) system ("DS") (i.e., the system 100). The associated access point 122 is configured to observe all information that is transmitted to the mobile device 128. The associated access point 122 is generally configured to provide information to at least one server 140 ("the server 140") and transits, among other packet, Beacon packets. This aspect will be discussed in more detail below. The access points 124 and 126 are each generally defined as a non-associated access point and transmit or broadcast beacons. The access points 124 and 126 are not connected to the server 160 (i.e., the non-associated access points 124 and 126 cannot report to the server 140).

Signals transmitted by the access points 122, 124, 126 are received by receivers in the form of the mobile devices 128, 130 which are operated by users 132. The users 132 are free to move around within the area covered by system 100. In the illustrated embodiment, the mobile devices 128, 130 are shown as cellular phone; but other types of mobile transceivers, such as laptop, tablets computers, wearable electronic devices (e.g., smart watches), Internet of Things (IoT) devices, etc. may be used in similar fashion. It is recognized that the number of mobile devices 128, 130 may also vary. It is also recognized that the mobile device 128 may also correspond to a location tag 137 that includes a wireless transceiver and other electronic circuitry that is arranged for attachment to an object 129. For example, the object 129 may correspond to a women's handbag (or purse) and the location tag 131 may provide information indicative of the location of the handbag 129. Each mobile device 128, 130 generally includes a MODEM or other apparatus for enabling wireless communication with the various access points 122, 124, 126 in the environment.

It is also recognized that the access points 122, 124, and 126 and the mobile devices 128, 130 may also wirelessly communicate with any number of sensors (also "receivers" or "passive receivers" or "location receivers") 131a, 131b, etc. It is recognized that any number of sensors (or receivers) 131a, 131b may be provided. In one example, the sensors 131a, 131b may be stationary location sensors such as for example, proximity sensors, geofencing sensors, etc. that are positioned throughout one or more floors of a building to detect the presence of the user 132. Generally speaking, the sensors 131a, 131b may be stationary and are programmed to receive beacons and other information from the access points 122, 124, 126 and data packets from the mobile devices 128, 130. This aspect will be discussed in more detail below. The sensors 131a 131b may also transmit information to at least one server 140. In one example, the sensors 131a, 131b may transmit angle of arrival readings to the server 140 for at least the purpose of determining the location of the mobile devices 128, 130. This aspect will be described in more detail below.

The location receivers 131a, 131b, etc. may find angles of arrival of signals transmitted by the mobile devices 128, 130. Each of location receivers 131a, 131b, etc., in the system 100 is assumed, for example, to have two or three antennas 135, as shown in FIG. 1. The number of antennas 135 may vary in the system 100. The mobile devices 128, 130 are each assumed to have a single, omnidirectional antenna 136, although the techniques described herein for detecting angles can similarly be implemented by multi-antenna stations.

Figure 2:
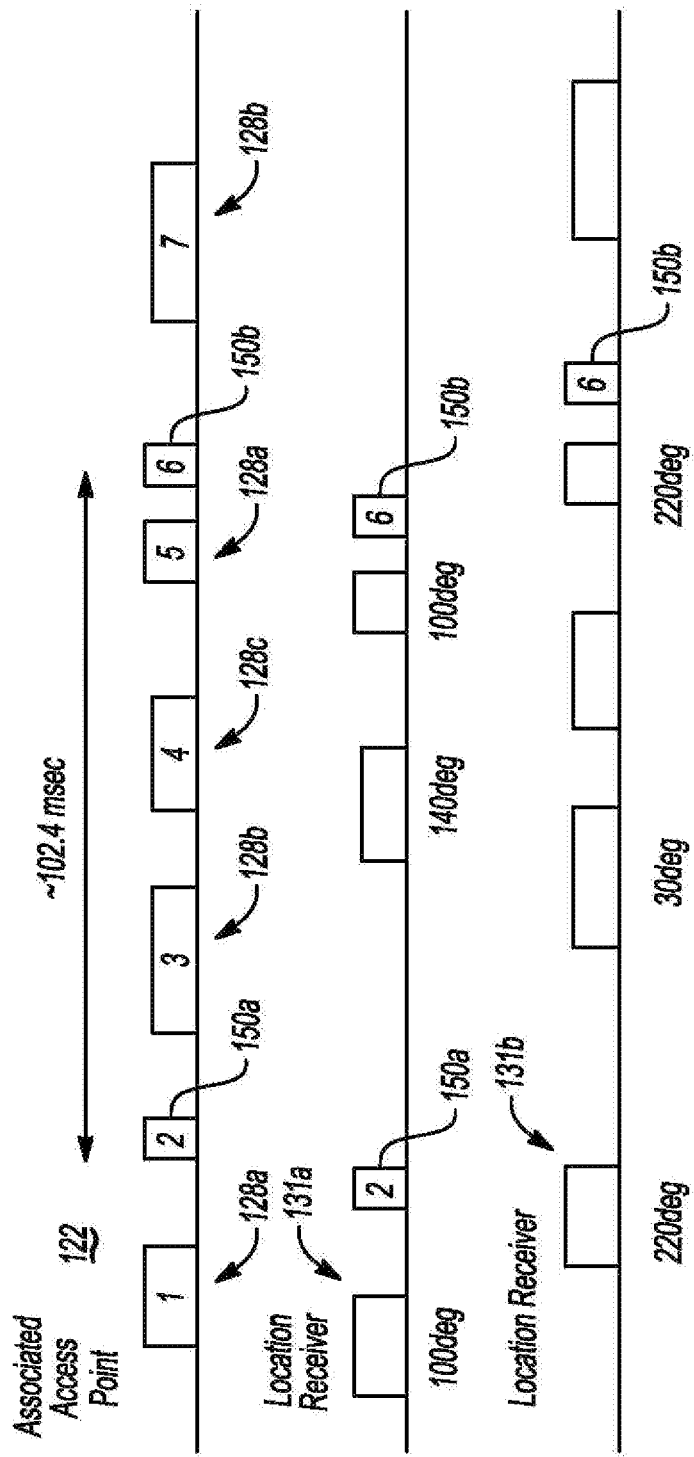
FIG. 2 depicts packets of information as transmitted from a transmitter to various receivers.

The server 140 includes a programmable processor 142 and a memory 144. The functions of the server 140 that are described herein are typically implemented in software running on processor 142, which may be stored on tangible, non-transitory computer-readable media, such as optical, magnetic or electronic memory media. As noted herein, there are inherent issues in piecing together an identity of a mobile device 128, 130 that is transmitting information to the associated access point 122 and various receivers 131 in a network. FIG. 2 provides a pictorial representation of such a challenge.

For example, FIG. 2 generally illustrates the transmitters 128*a*, 128*b*, 128*c* (or mobile devices 128*a*, 128*b*, 128*c*) that transmit packets (e.g., WiFi based packets) to the associated access point 122 and sensors 131*a*, 131*b* (hereafter "receivers 131*a*, 131*b*"). For example, the transmitter 128*a* may transmit packets 1 and 5, the transmitter 128*b* may transmit packets 3 and 7, and the transmitter 128*c* may transmit packet 4. It is recognized that access point 126 (e.g., the beacons used for time difference may or may not be associated with the associated access point 122 but for example, the access point 126) transmits beacons 150*a*, 150*b* (as packets 2 and 6) periodically at a predetermined rate (e.g., approximately every 102.4 ms) compliant with 802.11n (e.g., WIFI based standard). Similarly, the receivers 131*a*, 131*b* are intended to receive the beacons 150*a*, 150*b* (or packets 2, 6). However, as shown, the receiver 131*b* has not detected beacon 150*a* (e.g., as shown also as packet 2 (not a data packet however) in FIG. 2) but has detected beacon 150*b* (or packet 6 (not a data packet however)).

As generally shown in FIG. 2, the access point 126 is behind the receiver 131*a* in time and ahead of the receiver 131*b* in time. As also shown by example, the receiver 131*a* has not detected packets 3 and 7; and the receiver 131*b* has not detected packet 2. As noted above, transmitter 128*a* transmits packets 1 and 5. Thus, the angle of arrival (AoA) readings detected by the receiver 131*a* of packets 1 and 5 are approximately the same (e.g., 100 degrees). The angle of arrival is generally indicative of the location of the transmitter 128*a*, 128*a* is confined to a known line on the plane.

The receiver 131*b* also receives the packets 1 and 5 from the transmitter 128*a* and the AoA readings detected by the receiver 131*b* are approximately, for example, 220 degrees. The AoA readings for the receiver 131*b* in connection with the packets 1 and 5 are different than the AoA readings for the receiver 131*a* since the receivers 131*a* and 131*b* are positioned at different angles relative to the transmitter 128*a* (see FIG. 3). Assuming the receivers 131*a*, 131*b* and the transmitter 128*a* have been colinear and the transmitter 128*a* was not in the middle, then the respective AoA readings for the receivers 131*a*, 131*b* would have been roughly the same.

In general, it is recognized that data packets or (WiFi packets) (e.g., packets 1, 3, 4, 5, and 7) do not provide an identity to location receivers 131*a*, 131*b* for the transmitter 128*a*, 128*b*, 128*c* that transmits such packets for the reasons explained above. WiFi packets generally comprise a physical header (e.g., PHY) followed by a Medium Access Control (MAC) header then followed by a payload. While the identity of the transmitter 128*a*, 128*b*, 128*c* may be encoded into every data packet, not all receivers 131*a*, 131*b* are able to decode that portion of the message in the data packet. In general, the data packet or message includes the physical "PHY" header part, that is encoded in a simple/robust modulation scheme. This portion is designed to be comprehensible even in extreme link conditions. The PHY header does not include the identity of the transmitter 128*a*, 128*b*, 128*c*. The identity of the transmitter 128*a*, 128*b*, 128*c* may be part of the MAC header, that is transmitted after the PHY header. The unique access point 122 that the mobile device 128*a*, 128*b* is associated with, may be guaranteed to decode all packets that such mobile devices 128*a*, 128*b* bridges between a wireless network such as Basic Service Set "BSS" and a distribution system ("DS") wired network. An ARQ retry mechanism as set forth in 802.11 MAC protocol, in which the access point 122 may play an active part in, may assure reliable transmission of the entire message to the access point 122 that is protected by a Frame Check Sequence ("FCS").

It also bears mentioning that the data packets 1, 3, 4, 5, and 7 bear no unique explicit sequencing. The PHY header in the data packets (e.g., packets 1, 3, 4, 5, and 7) are not unique, as many packets bear the same PHY header. In contrast, a complete data packet may be very likely to be unique, particularly if encrypted. The full content of the packet may be available to the associated access point 122 but may not be available to the receivers 131*a*, 131*b*.

FIG. 2 generally conveys that the identity of the transmitters 128*a*, 128*b*, 128*c* cannot be ascertained by individual location receivers 131*a*, 131*b*. Such a lack of imperative determination may result in a detrimental consequence on location estimations for the transmitters 128*a*, 128*b*, 128*c*. For example, the receiver 131*a* may read the AoA reading from the transmitter 128*a* and the receiver 131*b* may read the AoA reading from the transmitter 128*b*, and a resultant mosaic would be a total outlier if falsely assumed to originate from the same location the transmitter is at.

In typical wireless protocols such as IEEE802.11 (e.g., WIFI standard), the modulation scheme is set adaptively, to optimize the data rate given link conditions. However, other receivers 131*a*, 131*b* may experience different, worse link conditions thereby precluding reliable reception of data. As noted above, WiFi packets as transmitted by the access points 122, 124, 126 and mobiles 128*a*, 128*b*, 128*c* etc. generally comprise the PHY header followed by the (MAC) header then followed by a payload. The packet PHY header may be designed to be robust to avoid medium packet collisions, for example, as part of an elaborate 'collision avoidance' mechanism in the protocol. Thus, the packet PHY header was designed to survive the most extreme link conditions to avoid the well-known "hidden node syndrome" whereby a transmitter 128*a*, 128*b*, 128*c* is useless to the receiver 131*a*, 131*b* but is unknowingly disrupting the reception of packets from closer transmitters 128*a*, 128*b*, 128*c*. In general, for each receiver 131*a*, 131*b* to extract Direction of Arrival ('DoA'), for example, this requires only the PHY header, hence such sensors (or receivers 131*a*, 131*b*) provide AoA readings but not the identity of the transmitter 128*a*, 128*b*, 128*c*. The physical header PHY provides an accurate estimation of a received epoch (e.g., the time at which the packet has arrived), as sampled by a local clock of the receivers 131*a*, 131*b*. However, local clocks at different sensor (or receiver 131*a*, 131*b*) locations are offset and also experience a slight drift due to crystal oscillator tolerance, typically up to 100 parts per million (ppm), up to one second every 2.78 hours. Further, for example in IEEE802.11 "wireless LAN" and as noted above, beacons 150*a*, 150*b* are sent approximately every 102.4 msec by the access points 124, that are typically stationary. The access points 122, 124, 126 transmit the beacons 150*a*, 150*b* to any potential receivers (e.g., the mobile device 128*a*, 128*b*, 128*c* or the receivers 131*a*, 131*b*) and hence the Beacons 150 cannot rate adapt and are not beam formed and are not MIMO encoded. Rather, the beacons 150 are CDD encoded which facilitates AoA techniques. Nearly all receivers 131*a*, 131*b* and the mobile devices 128, 130 are able to reliably receive the beacons 150 including the contents of the MAC layer. In general, the MAC layer in beacon packets comprise a discernible transmit time stamp. The MAC layer in Beacons 150a, 150b includes the source MAC address of the access point 122 plus the transmit time stamp which are globally unique in space-time, much like the NGC2270 example noted above. In general, beacon transmissions are like super nova events seen all over the globe that are distinguishable from one another.

The mobile devices 128, 130 (or transmitters 128a, 128b, 128c) transmit packets of type DATA that are not necessarily unique and use high-rate modulation schemes that may be beamformed and MIMO encoded and thus may not be typically legible by most locations receivers 131a, 131b in space. However, the receivers 131a, 131b are capable of receiving beacons 150 from the access points 122, 124, 126 which are time space unique, using a stationary receiver location and a monotonous local clock over their life span to time stamp received packets. By measuring time difference between (i) beacon 150 events in addition to MAC address and transmitter time stamp and (ii) data packet events comprising AoA and local receiver time stamps, receivers 131a, 131b may report their readings in an invariant form so that the location for each individual transmitter 128a, 128b, 128c can be estimated at a central location (e.g., the server 140) by collecting data from numerous receivers 131a, 131b over a reporting network. In general, the receivers 131a, 131b utilize the Beacons 150 sent by access points 122, 124, 126 as a time synchronization mechanism to data packets sent by the transmitters 128a, 128b, 128c either just prior to the transmission of the beacons 150a, 150b or after the beacons 150a, 150b. This differential reporting is not prone to network delay and jitter experienced between the location receiver and the server.

Each receiver 131a, 131b may provide the individual report that comprises the packet identification for the beacon 150, the receive epoch of the packet transmitted by the access points 122, 124, 126 and further the location information gleaned from the physical header of the data packet (e.g., angle of arrival, time of arrival, etc.) from the transmitters 128a, 128b, 128c. The server 140 may then coalesce all readings of data packets with almost identical time difference relative to the globally unique beacon events to provide a listing of a particular mobile packet transmission event in time with respect to the location of the transmitters 128a, 128b, 128c and receivers 131a, 131b so that an observation can be made at any single point in time. For greater accuracy, the clock drift between the receivers 131a, 131b may be mitigated by reporting the time difference between beacon packets from the access points 122 or 124 or 126 from different known location receivers.

Figure 3:
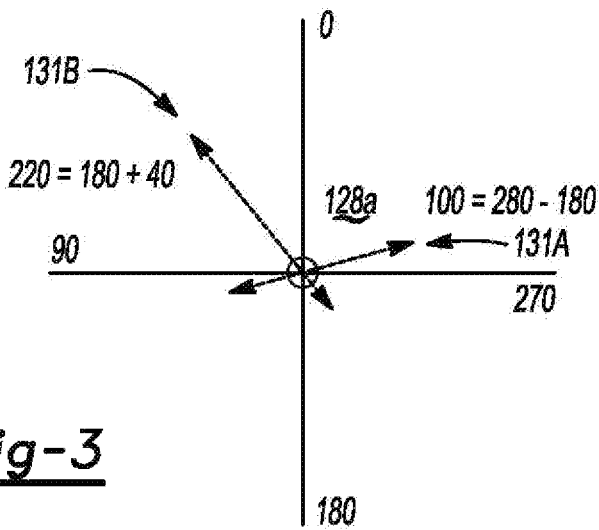
FIG. 3 depicts angle of arrivals for received signals for the receivers of FIG. 2.
Figure 4:
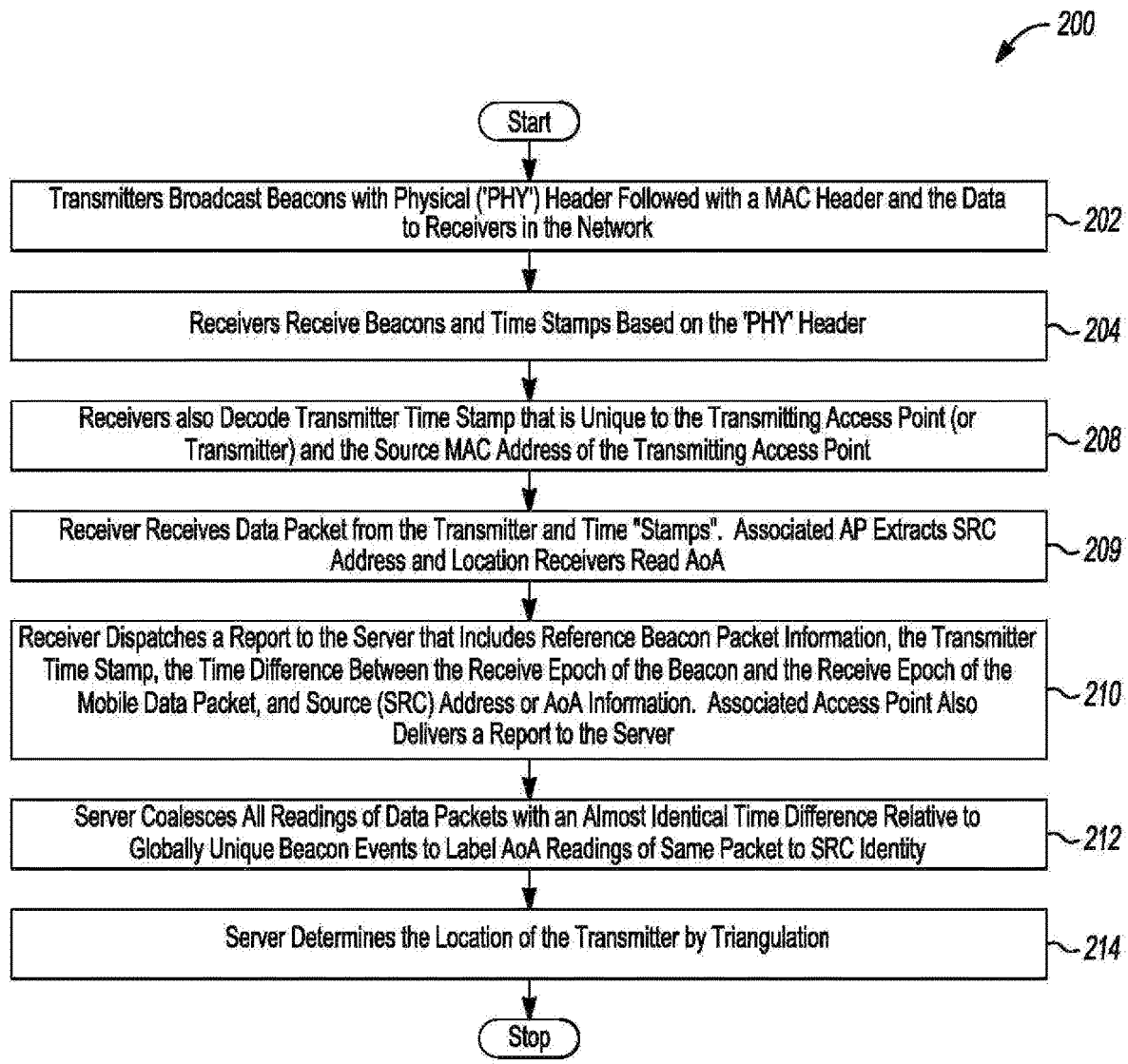
FIG. 4 depicts a method for identifying a transmitter location in accordance with one embodiment.

FIG. 4 depicts a method 200 for identifying a location of the transmitter 122, 124, 126 (or the mobile devices 128, 130) as performed by the system 100 in accordance with one embodiment. In general, the disclosure in reference to FIGS. 2-4 generally correspond to instances in which the access points 122, 124, 126 transmit beacons to the mobile devices (or transmitters 128a, 128b, 128c) whereby an acknowledgment may not be transmitted back to the access points 122, 124, 126 in response to such beacons. Similarly, FIGS. 2-4 also correspond to instances in which the access points 122, 124, 126 receive acknowledgements from the mobile devices 128a, 128b, 128c in response to data packets being previously transmitted from the access points 124, 126, 128 to the mobile devices 128a, 128b, 128c. However, in this case, the scheme as disclosed in connection with FIG. 6 may have to be executed to account for the acknowledgments that are transmitted back from the mobile devices 128a, 128b, 128c to the access points 122, 124, 126.

In operation 202, a corresponding transmitter (or access point) 122, 124, or 126 broadcasts a beacon 150 with a physical ('PHY') header followed by a source MAC header and then data to a corresponding receivers 131a, 131b in the network. It is recognized that the PHY header, MAC header and the data are all provided on a WiFi based packet. The transmitter 122, 124, or 126 also transmits a transmitter time stamp to the receivers 131a, 131b.

In operation 204, the receiver 131a, 131b receives the beacon 150 along with the transmitter time stamp from the corresponding transmitter 122, 124, 126. The receiver 131 generally determines the time at which the packets on the beacon 150 arrive as sampled by a local clock thereof to provide a receiver time stamp. In general, the beacon (s) 150 may be used as encores in time. Data events (or data packets) from the transmitters (or mobile devices) 128a, 128b, 128c are reported in reference to the unique beacons 150. For example, the data packets may be transmitted by the mobile devices 128a, 128b, 128c either just before, or right after the beacons 150 are transmitted by the access points 122, 124, 126. Thus, in this regard, the time differences between data packets and individual beacons 150 may be ascertained.

In operation 208, the receiver 131 extracts the transmitter time stamp on the beacon 150 for the corresponding access point 122, 124, 126. In addition, the receiver 131 also determines the source MAC address that is indicative of an identification for the corresponding access point 122, 124, 126. In general, the source MAC address is generally included in the MAC layer of the beacon 150 transmitted by the corresponding access point 122, 124, 126. The transmitter time stamp and MAC address for the corresponding access point 122, 124, 126 are globally unique in space-time. Beacon transmissions may be seen by receivers in the service area, and each beacon transmission is distinguishable from one another.

In operation 209, the receiver 131 receives the data packet from the transmitter 128a, 128b, 128c.

In operation 210, the receivers 131a, 131b and the associated access point 122 generate individual reports that include reference beacon packet information (e.g., the transmitter time stamp and the MAC address), the time difference between the receive epoch of the beacon 150 and the receive epoch of the mobile data packet (e.g., the packets transmitted by the transmitter 128a, 128b, 128c (or mobile device) (e.g., relative time measurement between when the beacon 150 is received at the receiver 131 and when the data packet is received at the receiver 131), and location information obtained from AoA via information in the PHY layer (or physical header) of data packets as received by location receivers 131a, 131b. The report the associated access point generates comprises the transmitter address (unique identity) in the data packet MAC layer but does not necessarily comprise the AoA information. The server 140 may determine the identity of the transmitter 128a, 128b, 128c by locating the same (within predefined margin of error) time difference between the same received beacon 150 and the received data packed for the receivers 131a, 131b in location receiver reports and the associated access point reports.

The time difference between the receive epoch of the beacon 150 and the receive epoch of the packets from the transmitters 128a, 128b, 128c (or mobile devices) may be described as follows. For example, the beacon 150 (or beacon packet) as transmitted by the access point 122, 124, 126 and the data packet as transmitted by the transmitters (or mobile devices) 128a, 128b, 128c are transmitted one after the other with no overlap by the transmitter 128a, 128b, or 128c, the former ends before the latter starts. The exact time at which either packet 'starts' at the receiver 131 end is well defined via the WiFi standard, with high accuracy, better than one microsecond. For example, a beacon start (epoch) has arrived at local time 1.111111 seconds at the receiver 131a, 131b and the data packet has arrived at 1.111999 seconds at the receiver 131a, 131b so the calculated difference is 0.000888 seconds or 888 microseconds.

In operation 212, each receiver 131 delivers (or transmits) the report to the server 140. The associated access point also delivers its report to server 140. The server 140 then coalesces all readings of data packets with an almost identical time difference relative to globally unique beacon events where observations of a single event in time from different known locations may be observed. This may be performed in the following manner. For example, the server 140 is being reported by a corresponding receiver 131a, 131b, and 131c that a beacon 150 with a transmitter timestamp of 111,222,333 microseconds (conventionally measured since the access point has recently booted, little over 111 seconds in the example) was received by the receivers 131a, 131b, and 131c. All three receivers 131a, 131b, or 131c also received data packets 344, 346, 347 microseconds later, respectively, from a corresponding transmitter 128. Each receiver 131a, 131b, or 131c measures the time difference using their local clock. The server 140 determines that all three-packet events stem from the same data packet transmission event which originate from a single particular mobile transmitter 128a, 128b, or 128c because the timing error is below a predetermined error. In other words, the server 140 determines the identity of the transmitter 128 since each receiver 131a, 131b, 131c, received the beacon 150 with transmitter timestamp of 111222333 and all three receivers 131a, 131b, 131c received the data packets from the transmitter 128 at generally the same time relative to the transmitter time stamp, and for example, the receiver 131c is the associated access point, the report of which comprises the identity of the mobile transmitter as decoded by the associated access point from the MAC layer of the transmitted data packet.

In operation 214, the server 140 determines the location of the transmitter 128 (once identified in operation 212) by utilizing triangulation. The server 140 performs triangulation on the identified transmitter 128 based on the AoA reading for the receiver 131a which is, for example, 100 degrees and based on the AoA reading for the receiver 131b, which is, for example, 220 degrees (see FIG. 3). Triangulation requires three or more AoA readings, one per location receiver, to assess the estimation error. One example of the manner in which triangulation may be employed based on AoA readings to determine the location of the transmitter 128 may be discloses in "Providing Localization using Triangulation Method in Wireless Sensor Network", in International Journal of Innovative Technology and Exploring Engineering (IJITEE) ISSN: 2278-3075, Volume-4 Issue 6, November 2014, Leelavathy S. R. and Sophia S.

Another example of performing triangulation is set forth as follows in connection with the FIG. 2. The receiver 131b reports the receipt of beacon 150b (e.g., 6), data packets 1, 3, 4, 5, and 7, and the receiver 131a reports the receipt of beacons 150a and 150b (e.g., 2 and 6), the receipt of data packets 1, 4, and 5; along with transmitter time stamps in beacons, etc. The data packets 1, 4, and 5 cannot be decoded by the location receivers 131, only the associated access point 122 but the location receiver 131a may estimate their AoA reading to 100 degrees, 140 degrees and 100 degrees, respectively. The server 140 provides the conjecture that packet depicted (4) reported by the receiver 131a and packet depicted (4) reported by receiver 131b is also reported by the associated access point 122 as packet 4 in FIG. 2. The time differences between packet 4 and beacon 6 (or beacon 150b) are almost identical among events reported by receiver 131a, receiver 131b and the associated access point 122, relative to the beacon 150b, within a predetermined receive time error range. (e.g., 10 µs and see events #s 12-24 in Table 500 of FIG. 10). At this point, packet 5 is known to have an AoA reading of 100 degrees as seen by the receiver 131a and an identity for the transmitter 128a as decoded by the associated access point 122 (see below as well). Given at least three AoA readings from the receivers of one particular packet (e.g., packet 5) in the example above are identified, the location of the transmitter 128a may be estimated by drawing three lines, one per receiver 131a, crossing the known location of the receiver 131a at the estimated AoA direction of 100 degrees (e.g., 99.9 see FIG. 3) for the receiver 131a. The three lines construct a triangle (FIG. 3 depicts only two lines for simplicity) that the transmitter 128a is confined into, by this estimation procedure. Referring back to FIG. 2, only the two receivers 131a, 131b are shown, however a third receiver may be required for the actual triangulation. It is recognized that while not shown in FIG. 3, there may be at least three receivers required to perform triangulation.

Figure 5:
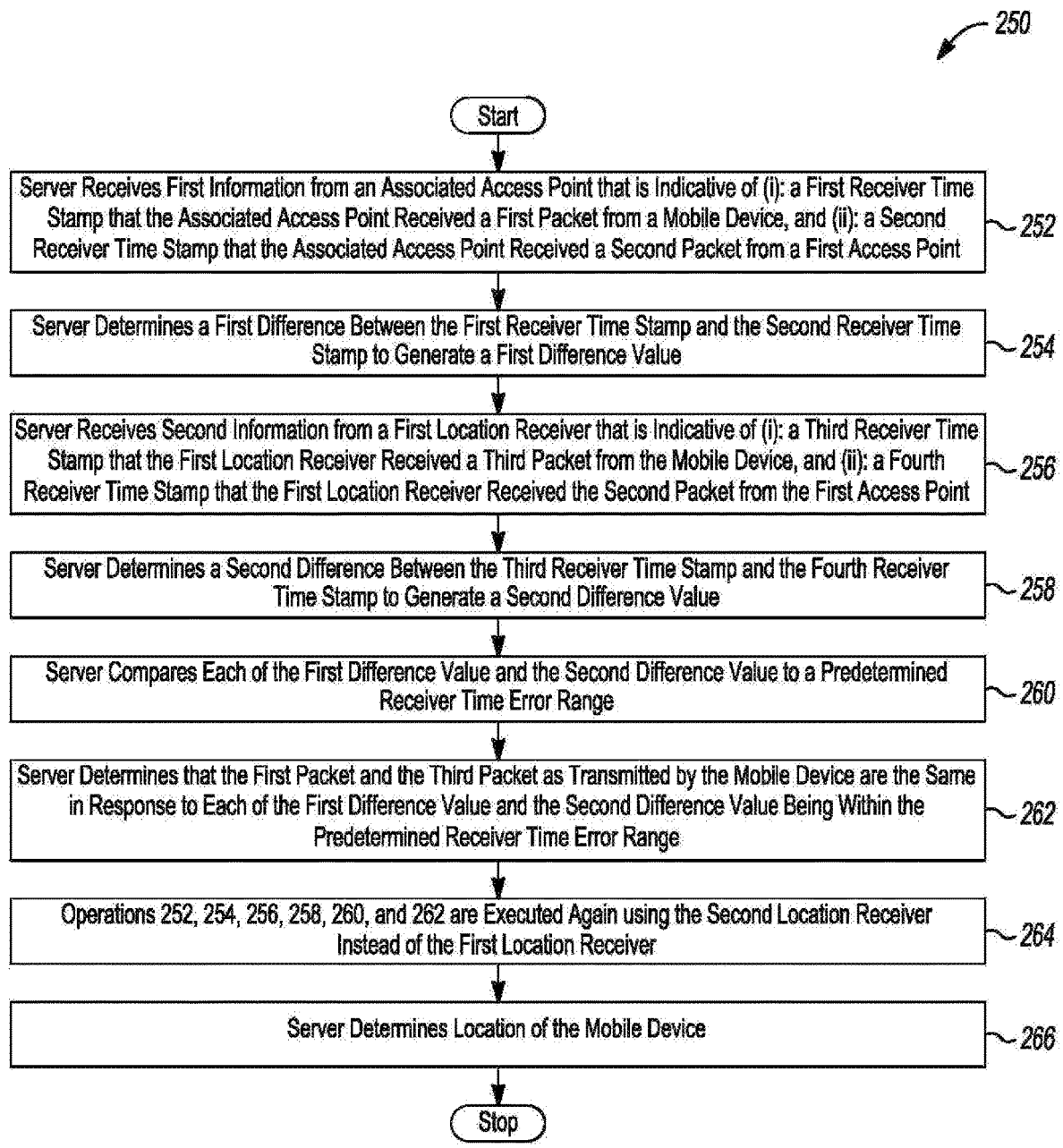
FIG. 5 generally corresponds to a more detailed method 250 for identifying a location of the transmitter as performed by the system of FIG. 1 in accordance with one embodiment.

FIG. 5 generally corresponds to a more detailed method 250 for identifying a location of the transmitter 122, 124, 126 (or the mobile devices 128, 130) as performed by the system 100 in accordance with one embodiment.

In operation 252, the server 140 receives first information from the associated access point 122 that is indicative of: (i) a first receiver time stamp that the associated access point 122 received a first data packet from the mobile device 128, and (ii) a second receiver time stamp that the associated access point 122 received a second (beacon) packet from the access point 124 (i.e., non-associated access point 124).

In operation 254, the server 140 determines a first difference between the first receiver time stamp and the second receiver time stamp to generate a first difference value.

In operation 256, the server 140 receives second information from the first location receiver 131a that is indicative of (i) a third receiver time stamp 131b that the first location receiver 131b received a third data packet from the mobile device 128, and (ii) a fourth receiver time stamp that the first location receiver 131a received the second (beacon) packet from the access point 124.

In operation 258, the server 140 determines a second difference between the third receiver time stamp and the fourth receiver time stamp to generate a second difference value.

In operation 260, the server 140 compares each of the first difference value and the second difference value to a predetermined receiver time error range.

In operation 262, the server 140 determines that the first packet and the third packet as transmitted by the mobile device 128 are the same in response to each of the first difference value and the second difference value being within the predetermined receiver time error range.

In operation 264, the server 140 re-executes operations 252, 254, 256, 258, 260, and 262 again however utilizing the second location receiver 131b instead of the first location receiver 131. For example, the server 140 performs the following in connection with the second location receiver 131b. The server 140 receives third information from the second location receiver 131b that is indicative of (i) a fifth receiver time stamp that the second location receiver 131*b* received a fourth packet from the mobile device 128, and (ii) a sixth receiver time stamp that the second location receiver 128 received the second packet from the access point 124. The server 140 determines a third difference between the fifth receiver time stamp and the sixth receiver time stamp to generate a third difference value.

The server 140 then compares each of the first difference value and the third difference value to the predetermined receiver time error range and determines that the first packet and the fourth packet as transmitted by the mobile device 128 are the same in response to the first difference value and the third difference value being within the predetermined receiver time error range. The server 140 then obtains AoA information from the first location receiver 131*a* and the second location receiver 131*b* that indicates a direction of the mobile device 128 relative to an orientation of the first location receiver 131*a* and the second location receiver 131*b*. In operation 266, the server 140 determines the location of the mobile device 128 based at least on the AoA information as received from the first location receiver 131*a* and the second location receiver 131*b*.

Figure 6:
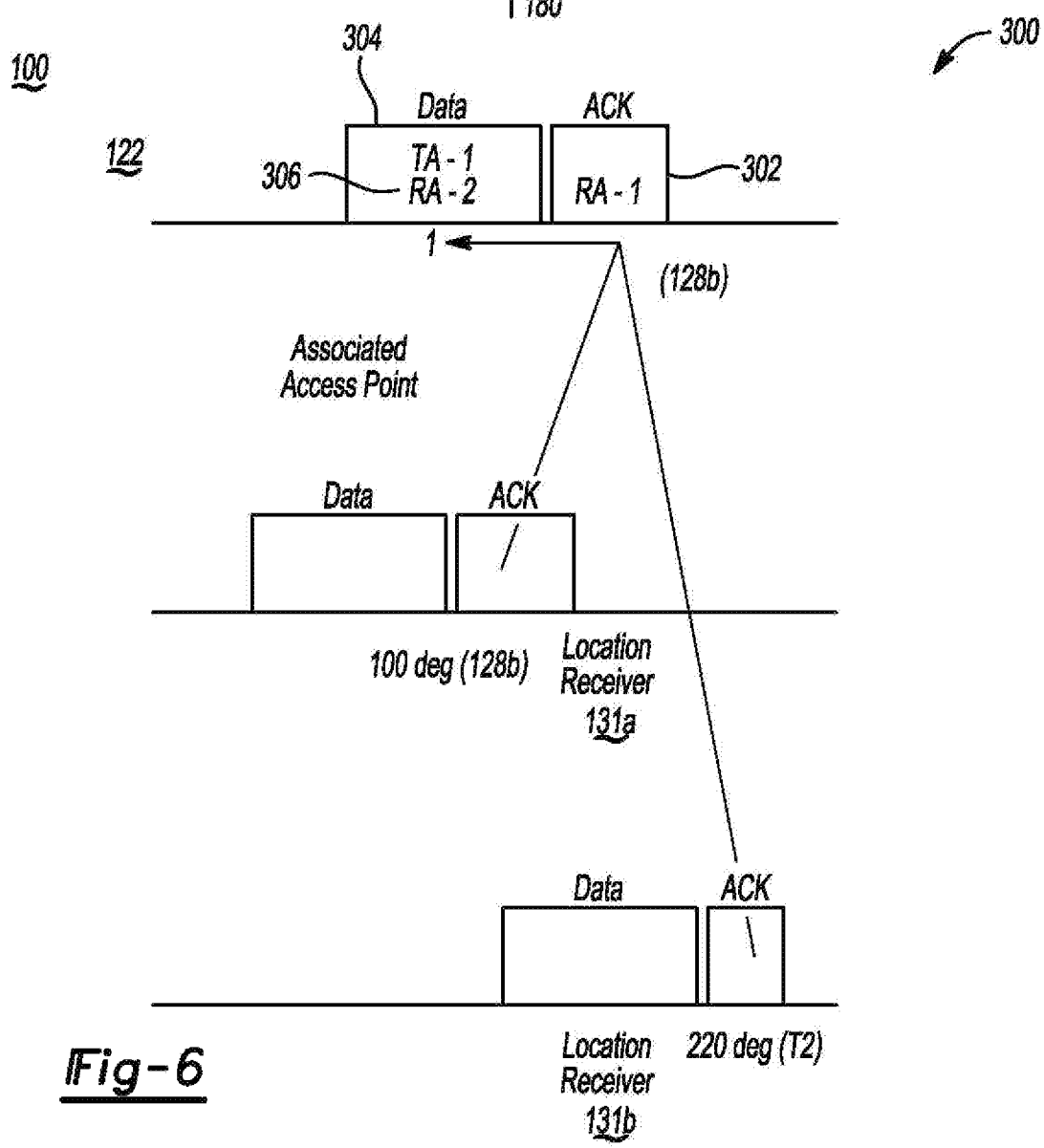
FIG. 6 is a scheme that represents identifying a transmitter based on coalesced immediate events as performed by the system of FIG. 1 in accordance with one embodiment.

FIG. 6 is a scheme 300 that represents identifying the access point 122 based on coalesced immediate acknowledgment packet events as performed by the system 100 in accordance with one embodiment. The scheme 300 may be employed when the mobile device (or transmitter 128) transmits an acknowledgment packet (or acknowledgment) back to the access point 122 in response to receiving data packet 128*c* from the access point 122. In some cases, the transmitters 128*a*, 128*b*, 128*c* may transmit the acknowledgment back to the associated access point 126 for example. In other cases, the transmitters 128*a*, 128*b*, 128*c* may not transmit the acknowledgment back to the associated access point 126 for example. If the case is the latter, then the operations as set forth in. It is recognized that the method 200 provides the manner in which the identity reading in the associated access point 122, 124, 126 may be used to identify the location of the transmitter 128*a*, 128*b*, 128*c* with the receiver 131*a*, 131*b* (e.g., by coalescing two receiver readings of the same event). However, the scheme 300 also employed by the system 100, may identify the transmitters 128*a*, 128*b*, 128*c*, via the server 140, by coalescing two events into one with the access point 122, 124, 126. For example, the WiFi protocol (e.g., IEEE802.11) relies on a mechanism called Immediate Acknowledgment where access point 122*a* transmits a packet to the mobile device 128*b*. In this case, mobile device 128*b* immediately transmits an acknowledgement packet (or ACK packet) 302 back to the access point 122 to acknowledge the reception of the data packet from the access point 122. However, the identity of the transmitter 128*b* is absent from the ACK packet that is sent back to the access point 128*b*, only the identity of access point 128 is embedded in the packet, as per IEEE802.11. It is possible to reveal the identity of the transmitter 128*b* implicitly by observing a MAC header 304 in the data packet sent immediately before the ACK packet is received. For example, the MAC header 304 includes a receiver address (RA) field 306. Thus, the server 140 may review the contents of the RA field 306 in the MAC header 304 in response to receiving the ACK packet 302 from the transmitter 128*b* to determine which transmitter 128 had sent the ACK packet 302. In the scheme 300 illustrated in FIG. 6, the RA field 306 is set to transmitter 128*b* (or T2) and in this case, the server 140 determines that the transmitter 128*b* sent the ACK packet 302.

FIG. 6 also illustrates that the receivers 131*a*, 131*b* receive data packets (e.g., DATA) from access point 122 and the ACK packet from the transmitter 128*b*. The receivers 131*a*, 131*b* are receiving the ACK from the transmitter (or mobile device 128*b*). The receivers 131*a*, 131*b* also measure AoA readings from the transmitter 128*b* (e.g., AoA reading of 100 degrees for the receiver 131*a* and AoA reading of 220 degrees for the receiver 131*b*). FIG. 6 illustrates that while the receivers 131*a*, 131*b* receive the data packets and acknowledgment packets, the contents of the data packets at the MAC layer are not known or provided as described above. It is also recognized that the receivers 131*a*, 131*b* also receive the beacons 150 from the access points 122 which include the transmitter time stamps for the access points 122, 124. As noted above, the transmitter time stamps are indicative of the time that the access point 122 transmitted the beacon 150 to the receivers 131*a*, 131*b*. Similarly, the receivers 131*a*, 131*b* receive timestamped transmitter acknowledgments as transmitted by the transmitter 128*a* (i.e., the mobile device 128*a*). Thus, in this regard, the receivers 131*a* generate time stamps for both the access points 122*a*, 122*b* and the mobile devices 128*a*, 128*b*. There may be two types of time stamps. For example, a first type of time stamp (or transmitter time stamp) may be embedded into the beacon packets by the access points 122, 124 and a second type of time stamp (or receiver time stamp) is a time stamp that is taken by the receiver 131 when the beacon 150 or data or acknowledgment are received. Thus, the beacon packets comprise both a transmitter time stamp (e.g., time stamp from the access point 122) and a receiver time stamp (e.g., time stamp at the receiver 131). Thus, the receiver 131 determines the time difference between timestamp of the beacon 150 as received at the receiver 131 and the time stamp of the data packet (or acknowledgment) for reporting to the server 140. The transmitter time stamps (e.g., the time stamp embedded in the beacon 150 that is transmitted by the access point 122) is used to make individual beacons 150 identifiable among multiple receivers 131*a*, 131*b* (e.g., time difference reports relative to beacons embedded with the transmitter time stamp by receivers 131*a*, 131*b* that are made relative to the same beacon transmission event).

As noted above, the server 140 may determine the identity of the transmitter 128 based on reviewing the contents of the RA field 306 after receiving the acknowledgment from the transmitter 128. The server 140 also receives the transmitter time stamps from the access point 122 (e.g., via the beacons 150) and the mobile device 128 (e.g., via the acknowledgment) from the receivers 131*a*, 131*b* to determine when the identified transmitter 128 transmitted information based on multiple receptions of the beacons 150. Based on the identity of the transmitter 128 and on the transmitter time stamps, the server 140 can determine or identify different receptions for individual transmissions. The receivers 131*a*, 131*b* may then report the AoA readings that they measure to the server 140. The server 140 may determine the location of a single transmitter 128 (e.g., the mobile device) based on the identity of the transmitter 128 and two or more AoA readings.

Figure 7:
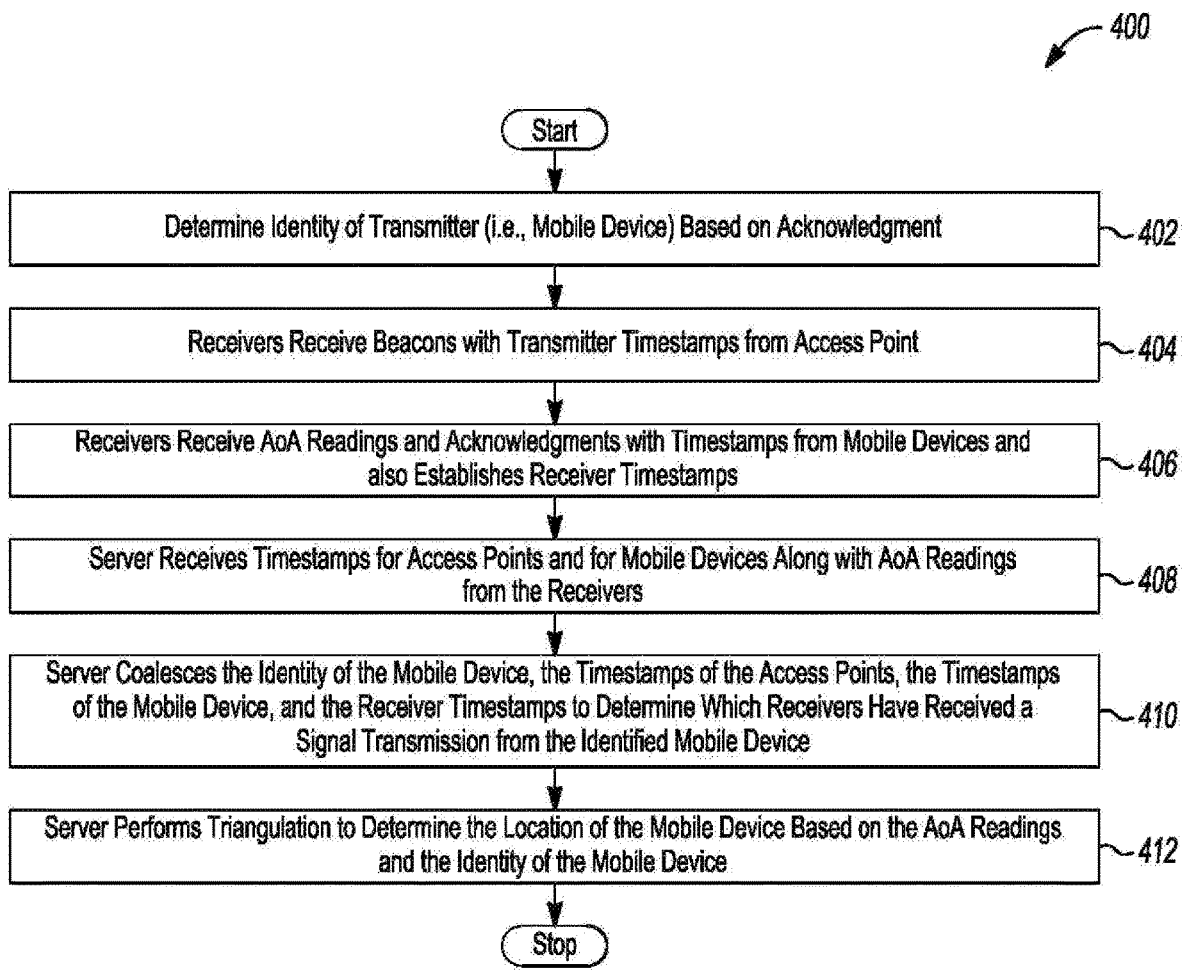
FIG. 7 is a method for determining the location of the receiver based on the scheme of FIG. 5 in accordance with one embodiment.

FIG. 7 is a method 400 for determining the location of the receiver based on the scheme 300 of FIG. 6 in accordance with one embodiment.

In operation 402, the server 140 determines the identity of the transmitter (i.e., the mobile device) 128 based on the receipt of the acknowledgment as described in connection with the scheme 200 of FIG. 5. As noted above, the access point 122, 124, 126 receives an acknowledgment packet (or acknowledgment) 302 from the transmitter 128*a* or 128*b* or 128c to confirm the receipt of the data packet from the access point 122, 124, 126. The access point 122, 124, 126 transmits information corresponding to the MAC header 304 including the RA field 306 to the server 140. The server 140 may then observe the contents in the MAC header 304 (e.g., the contents of the RA field 306) to determine which transmitter 128 had sent the acknowledgment packet 302. It is recognized that the access point 122, 124, 126 may transmit information corresponding to the MAC header 304 including the RA field 306 and acknowledgment packet 302 to the server 140 to enable the server 140 to determine the identity of the transmitter 128.

In operation 404, the receiver 131 receives the beacon 150 along with transmitter time stamps from the access point 122, 124, 126.

In operation 406, the receiver 131 also receives AoA readings and acknowledgment packets 302 from the transmitters 128. The receiver 131 determines the time at which the packets on the beacon 150 arrive as sampled by a local clock thereof to provide a receiver time stamp.

In operation 408, the server 140 aggregates reports from location receivers of the transmitter time stamps and MAC addresses transmitted by the access point 122 (e.g., via the beacons 150), and the packet received time stamps plus AoA readings from the receivers 131a, 131b to report pairs of relatively received time stamps and AoA readings. Time stamps are relative to beacons 150. The following example describes the manner in which the identified mobile device (or transmitter) transmitted the acknowledgment and the receivers 131a, 131b receive the acknowledgment at almost a single point in time (e.g., almost because of slightly different propagation delays within an acceptable margin of error). In reference to the FIG. 2 (see also TABLE 500, event number 21 (see 502)), the data packet 4 detailed transmitter 128c and a receiver address for transmitter 128a. The next packet in time, received by the associated access point 122, comprises according to IEEE802.11 only the receiver address, starting at transmitter 128c as the receiver. The server 140 may arbitrarily annotate this data packet as packet #5. The server 140 may need to reveal the mobile identity packet #5 originated from the mobile device. Packet #5 states that it is directed at transmitter 128c. The server 140 may go back in time one packet, annotated #4 verifying it was sent by transmitter 128c. Packet #4 declares being directed at transmitter 128a, hence, by inference, packet #5 has originated from the mobile transmitter 128a. It is likely the server 140 may need to go back in time only one packet, annotated #4. In such inferred scenarios, acknowledgement packet #5 is sent immediately after packet #4, in response to packet #4. It is recognized that acknowledgment packets do not report the identity of the originator (or transmitter 128a, 128b, 128c), but rather the identity of the intended recipient of the acknowledgement. The identity of the originator is revealed by inference from the previous packet (e.g., annotated data packet #4 as transmitted to transmitter 128a).

In operation 410, the server 140 coalesces readings at same relative time stamps, relative to particular beacon reports, and particularly transmit time stamps and transmitter MAC addresses. Location receivers provide AoA readings, the associated access point provides the identity of the transmitter 128 (e.g., mobile device). FIG. 7 as described below provides more details in connection with operation 410 (and with operation 212 as noted in connection with FIG. 4.

In operation 412, the server 140 performs triangulation to determine the location of the transmitter 128. As noted above, triangulation may be performed as follows. The receiver 131b reports the receipt of packet 5. The receiver 131a reports the receipt of packet 5. Given AoA readings from three known location receivers of the same packet transmission event and the identity of the transmitter characterized by a unique MAC address, the server 140 triangulates the lines crossing the known locations of the receivers depicted in FIG. 3, at the measured AoA the receivers were reading individually, to a triangle inside which transmitter 128 is estimated to be located.

Figure 8:
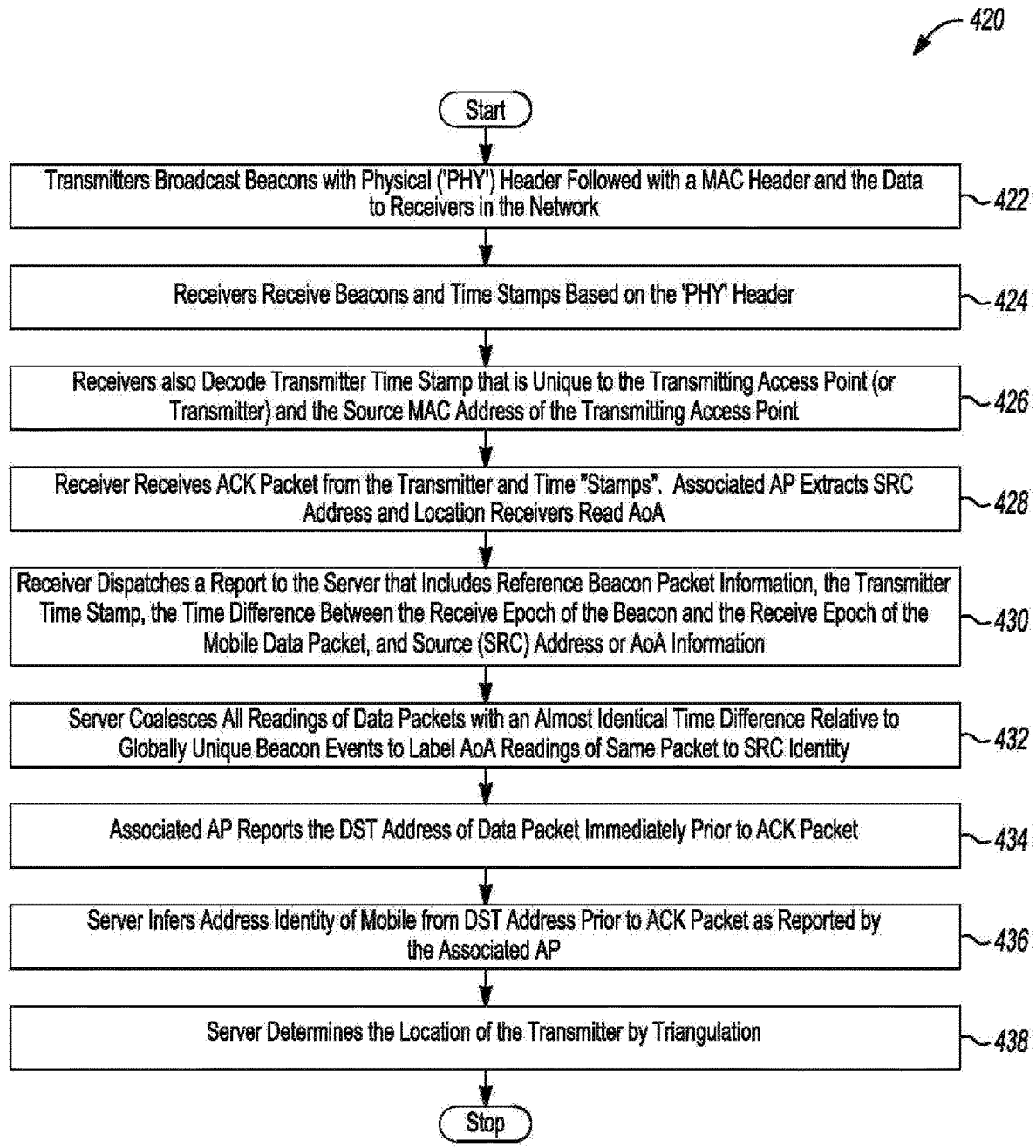
FIG. 8 is another method for determining the location of the receiver based on the scheme of FIG. 5 in accordance with one embodiment.

FIG. 8 is another method 420 for determining the location of the receiver based on the scheme of FIG. 5 in accordance with one embodiment. Operations 422, 424, 426, 428, 430, and 438 are similar to operations 202, 204, 208, 209, 210, 212, and 214; respectively as set forth in FIG. 4. As such, these operations will not be described below. Operations 434 and 436 are unique to the method 420.

In operation 434, the associated access point 122 reports a destination ("DST") address of the data packet immediately prior to the ACK packet.

In operation 436, the server 140 infers the address identity of the mobile device 128 from the DST address prior to the ACK packet as reported by the associated access point 122.

Figure 9:
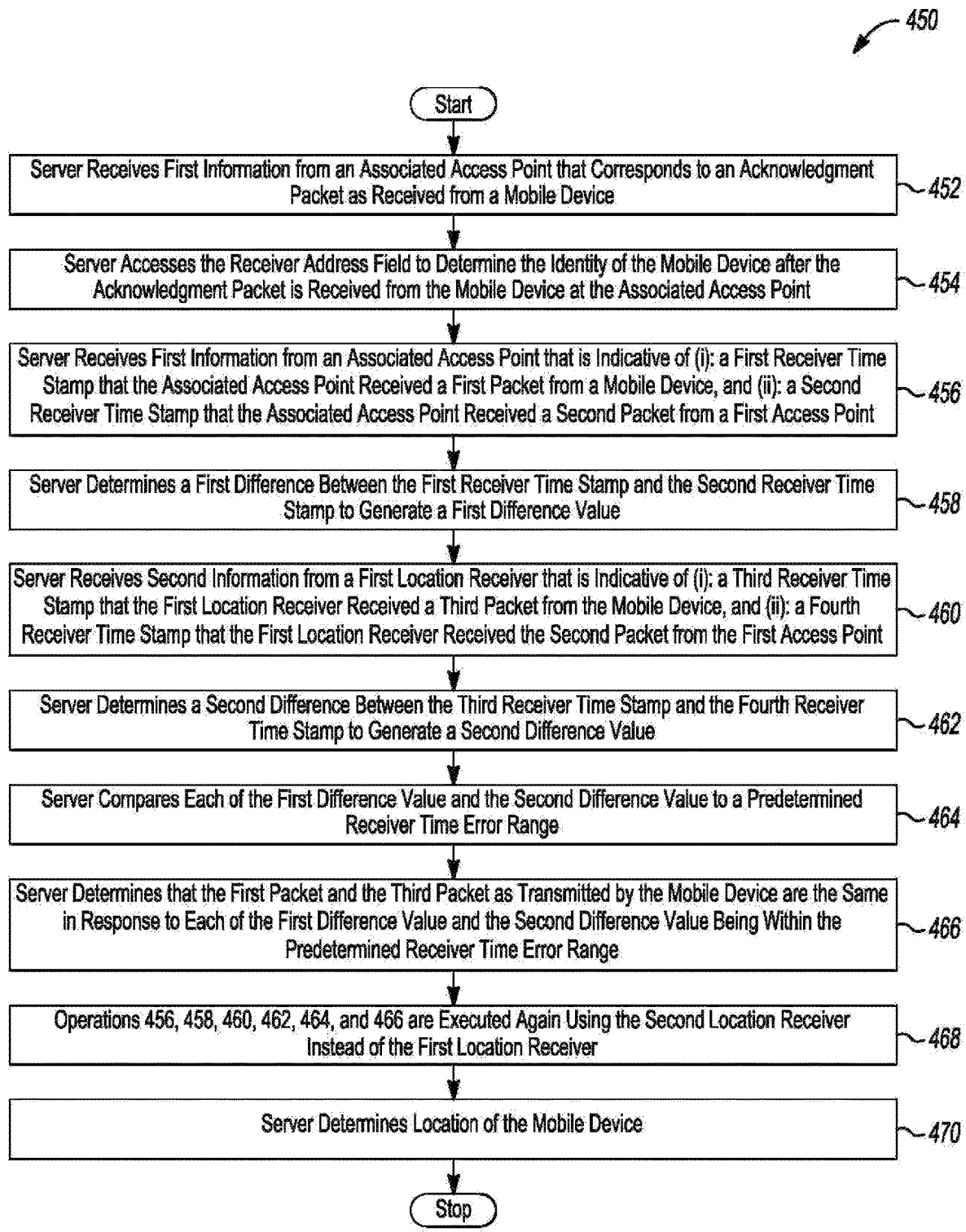
FIG. 9 depicts a more detailed method for determining a location of the mobile device for the scheme of FIG. 6 and the system of FIG. 1 in accordance with one embodiment.

FIG. 9 depicts a more detailed method 450 for determining a location of the mobile device 128 for the scheme 300 of FIG. 6 and the system 100 of FIG. 1 in accordance with one embodiment.

In operation 452, the server 140 receives first information from the associated access point 122 that corresponds to the acknowledgment packet 302 as received from the mobile device 128. The acknowledgment packet 302 is transmitted by the mobile device 128 in response to the data packet that is transmitted by the associated access point 122 and the first information further corresponding to a receiver address field 306 in the data packet that provides an identification of the mobile device 128 for the associated access point 122 to transmit the data packet thereto.

In operation 454, the server 140 accesses the receiver address field 306 to determine the identity of the mobile device 128 given the acknowledgment packet 302 is received from the mobile device 128 at the associated access point 122.

In operation 456, the server 140 receives first information from the associated access point 122 that is indicative of: (i) a first received time stamp that the associated access point 122 received a first packet from the mobile device 128, and (ii) a second received time stamp that the associated access point 122 received a second beacon packet from the access point 124 (i.e., non-associated access point 124).

In operation 458, the server 140 determines a first difference between the first received time stamp and the second receiver time stamp to generate a first difference value.

In operation 460, the server 140 receives second information from the first location receiver 131a that is indicative of (i) a third received time stamp 131b that the first location receiver 131b received a third packet from the mobile device 128, and (ii) a fourth received time stamp that the first location receiver 131a received the second packet from the access point 124.

In operation 462, the server 140 determines a second difference between the third received time stamp and the fourth received time stamp to generate a second difference value.

In operation 464, the server 140 compares between the first difference value and the second difference value to meet a predetermined received time error range.

In operation 466, the server 140 determines that the first packet and the third packet as transmitted by the mobile device 128 are the same in response to each of the first difference value and the second difference value being within the predetermined receiver time error range. The packet received by the associated access point reveals the MAC address identity of 128. The packet received by a location server provides necessary information for the triangulation of 128.

In operation 468, the server 140 re-executes operations 456, 458, 460, 462, 464, and 468 again however utilizing the second location receiver 131b instead of the first location receiver 131. For example, the server 140 performs the following in connection with the second location receiver 131b. The server 140 receives third information from the second location receiver 131b that is indicative of (i) a fifth receiver time stamp that the second location receiver 131b received a fourth packet from the mobile device 128, and (ii) a sixth receiver time stamp that the second location receiver 128 received the second packet from the access point 124. The server 140 determines a third difference between the fifth receiver time stamp and the sixth receiver time stamp to generate a third difference value.

The server 140 then compares each of the first difference value and the third difference value to the predetermined receiver time error range and determine that the first packet and the fourth packet as transmitted by the mobile device 128 are the same in response to the first difference value and the third difference value being within the predetermined receiver time error range. The server 140 then obtains AoA information from the first location receiver 131a and the second location receiver 131b that indicates a direction of the mobile device 128 relative to an orientation of the first location receiver 131a and the second location receiver 131b. In operation 470, the server 140 determines the location of the mobile device 128 based at least on the AoA information as received from the first location receiver 131a and the second location receiver 131b.

Figure 10:
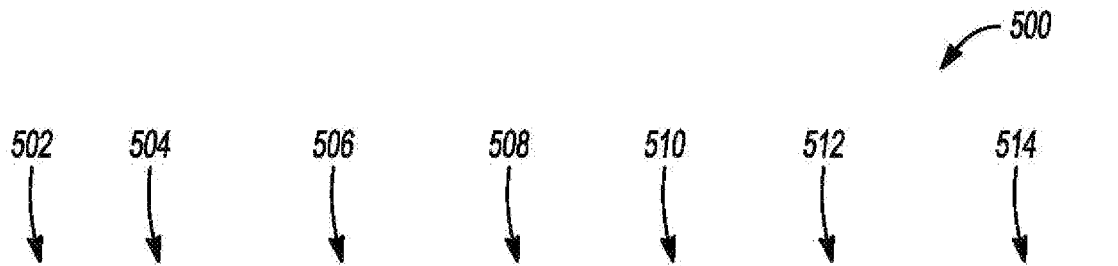
FIG. 10 depicts an example of a table that may be used by a server coalesces an identity of a mobile device based at least one on transmitter timestamps from an access point, transmitter timestamps of mobile device, and receiver timestamps from a receiver to determine which receiver has received a signal transmission from the identified transmitter in accordance with one embodiment.

FIG. 10 depicts an example of a table 500 that may be used by the server 140 to coalesce an identity of the mobile device 128 with AoA reading transmitted by 128 based at least on transmitter timestamps from the access point 122, 124 Beacons; received timestamps of the mobile device 128a, 128b data packets; and receiver timestamps from the receiver 131a, 131b of beacons from access point 122, 124 to determine the identity of mobile data packet AoA readings' in accordance with one embodiment. Column 502 depicts various event numbers which correspond to various transmission events. Column 504 depicts the receiver enumeration or generally, the device that is receiving a beacon 150, data packet, or acknowledgment. Column 504 illustrates that an associated access point 122 may receive a data packet or acknowledgment and this condition applies to any of the embodiments as set forth herein. As noted throughout the disclosure, any one of the receivers 131a, 131b, 131c and the associated access point 122 may receive the beacon 150, the data packet, and/or the acknowledgment. For example, as illustrated in the table 500, events are numbered 12-24 and it should be recognized that events prior to events 12-24 also take place and that events after event number 24 also occur.

Column 506 generally represents the time stamp as embedded by the transmitting device (e.g., transmitter as identified in column 514) in beacon 150. Column 508 generally represents the time stamps generated by the receiving device (e.g., receiver 131a, 131b, 131c and associated access point 122) in response to receiving either the beacon 150, the data packet, or the acknowledgment. As discussed above, the receiver timestamps are generated based on an internal clock that resides on the receiver 131a, 131b, 131c and associated access point 122 in response to receiving the beacon 150, data packet, or acknowledgment.

Column 510 generally corresponds to AoA readings of packets the transmitters (e.g., mobile devices 128), received and estimated by the location receivers 131. Column 512 generally corresponds to a center annotation of reported received packet events, by the receivers 131a, 131b and the associated access point. Individual packets are uniquely annotated as described in 410. All reports of individual events are annotated the same. For example, in connection with FIG. 2, the 5th packet in the associated access point 122, the 4th packet in the report from the receiver 131a and the 4th packet in the report from the receiver 131b, all relate to the same event, and the server 140 annotates as packet #5. This annotated event originates from the transmitter 128a, reads an AoA reading of 100 degrees from the receiver 131a, and reads the AoA reading of 220 degrees from the receiver 131b. The numeral designations of 1, 3, 4, 5 and 7 correspond to data or acknowledgment packets and numerical designations of 2 and 6 correspond to beacons 150a, 150b. Column 514 generally corresponds to the transmitting device unique identity that is transmitting the beacon 150, data packet, or acknowledgment. In this case, the transmitting device may be the associated access point 122 and the non-associated access point 124 or the mobile device 128.

In reference to FIGS. 2 and 10, the access point 122 (event #23) reports receiving a data packet from the transmitter 128a (e.g., data packet #5) at a local time (or receiver time stamp) of 3,980.03 μsec and then receives beacon 150b (e.g., beacon #6) from another access point 124 with an embedded transmitter timestamp of 1,000,000 microseconds at a local time (or receiver time stamp) of 4000.04 μsec (see event #17).

Similarly, the receiver 131a reports receiving the data packet from the transmitter 128a (e.g, data packet #5) at a local time of 14,000.01 μsec with an AoA reading of 99.9 degrees (see event #24) and then the beacon packet 150b embedded with the transmitter time stamp 1,000,000 microseconds at a local time (or receiver timestamp) of 14,020.10 μsec (see event #18). In this instance, the time difference between the receiver time stamp of the receiver 131a when the beacon 150 arrives (e.g., 14,020.01 μsec) and the receiver time stamp of the receiver 131a when the data packet arrives (e.g., 14,000.10 μsec) is equal to 19.91 μsec.

In addition, the receiver 131b reports receiving the data packet (e.g., data packet #5) from the transmitter 128a (e.g., data packet #5) at a local time (or receiver timestamp) of 11,000.05 μsec with an AoA reading of 219.9 degrees (see event #22) and then the beacon packet 150b (e.g., beacon #6) embedded with the transmitter time stamp 1,000,000 μsec at a local time (or receiver timestamp) of 11,019.85 μsec (see event #19). In this instance, the time difference between the receiver time stamp of the receiver 131b when the beacon 150 arrives (e.g., 11,019.85 μsec) and the receiver time stamp of the receiver 131a when the data packet arrives (e.g., 11,000.05 μsec) is equal to 19.8 μsec.

For packet identification by time differences, the receiver 131, also known as a MODEM, provides a resolution of 16 samples (or better) at 20 MHz (i.e., 16*50 nsec=0.8 μs, the error in difference may be no worse than double (i.e., 1.6 μs). The difference in propagation path between the transmitter 128 and the plurality of receivers 131 amount to 333 m/μs. A typical environment is limited in size to 100 m on the side, so the error is limited to 0.5 μs. At the medium access layer, packets are separated by at least 10 μs from a tail of one packet to a head of the next packet. In general, tail of packet to head of next packet are separated by the length of the shortest packet plus inter packet gap, at least 26 μs, very typically 100-400 μs. Hence, a 2.1-26 μs margin of error safely accounts for inherent uncertainties while accurately assures discerning between adjacent packets. In light of the foregoing, a margin of, for example, 100 μs may serve as a predetermined receiver time interval for the time differences to be considered equal to one another.

As seen the time difference for the receiver 131a (e.g., 19.91 μsec) is generally similar to the time difference for the receiver 131b (e.g., 19.8 μsec). Thus, in this regard, it can be concluded that the receivers 131a and 131b received the same data packet from the transmitter 128. One can also conclude a transmission event of a data packet from a transmitter to two or more receivers in a network based on the disclosed method 200.

In the above noted example, the server 140 determines the identity of the transmitter 128a by at least collecting the transmitter time stamps on beacons 150b transmitted from the access points 122 and the receiver time stamps of the receivers 131a, 131b. For example, the server 140 may identify all of the receivers in the system 100 that have a similar transmitter time stamp as reported on a beacon and then obtain a difference between the receiver timestamps for all of the identified receivers 131a, 131b. In the event the time difference between various receiver timestamps is similar to one another, the server 140 may then determine (or infer) which transmitter 128 originated a single transmission event (e.g., transmitted a data packet) to the corresponding receivers 131a, 131b at a single point in time. For purposes of clarification, the server 140 may determine the identity of location receiver 131a, 131b reported events by finding events of same relative time difference to known beacon events, extracting the identity from the report sent by the associated access point 122.

It is recognized that the system 100 may employ the method noted above which involves collecting all reported transmitter time stamps from the beacons 150 as received by the receivers 131a, 131b, 131c and then taking a difference between the receiver time stamp of the data packet received at the receiver and the receiver time stamp of the beacon received at the receiver to determine which of the set of received data packet reported have the same difference relative to known beacon events is based on the fact that all packets received by location receivers 131a, 131b and the associated access point 122 are received at the same time, up to minute propagation delay differences smaller than the allowed time difference error as noted above. Further in reference to the table 500 and to FIG. 2, the beacon 150a has not been received by the receiver 131b. However, the beacon 150a has been received by the receiver 131a so in event #12, it may be inferred using the beacon 150b as reported in event #16.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An apparatus for generating a mosaic for a wireless communication system, the apparatus comprising:
   memory; and
   a server including the memory and being programmed to:
      receive first information from an associated access point that is indicative of: (i) a first receiver time stamp that the associated access point received a first packet from a mobile device, and (ii) a second receiver time stamp that the associated access point received a second packet from a first access point,
      determine a first difference between the first receiver time stamp and the second receiver time stamp to generate a first difference value;
      receive second information from a first location receiver that is indicative of (i) a third receiver time stamp that the first location receiver received a third packet from the mobile device, and (ii) a fourth receiver time stamp that the first location receiver received the second packet from the first access point,
      determine a second difference between the third receiver time stamp and the fourth receiver time stamp to generate a second difference value;
      compare each of the first difference value and the second difference value to a predetermined receiver time error range; and
      determine that the first packet and the third packet as transmitted by the mobile device are the same in response to each of the first difference value and the second difference value being within the predetermined receiver time error range.

2. The apparatus of claim 1, wherein the server is further programmed to receive third information from a second location receiver that is indicative of (i) a fifth receiver time stamp that the second location receiver received a fourth packet from the mobile device, and (ii) a sixth receiver time stamp that the second location receiver received the second packet from the first access point.

3. The apparatus of claim 2, wherein the server is further programmed to determine a third difference between the fifth receiver time stamp and the sixth receiver time stamp to generate a third difference value.

4. The apparatus of claim 3, wherein the server is further programmed to:
   compare each of the first difference value and the third difference value to the predetermined receiver time error range; and
   determine that the first packet and the fourth packet as transmitted by the mobile device are the same in response to the first difference value and the third difference value being within the predetermined receiver time error range.

5. The apparatus of claim 4, wherein the server is further programmed to obtain Angle of Arrival (AoA) information from the first location receiver and the second location receiver that indicates a direction of the mobile device relative to an orientation of the first location receiver and the second location receiver.

6. The apparatus of claim 5, wherein the server is further programmed to determine a location of the mobile device based at least on the AoA information as received from the first location receiver and the second location receiver.

7. The apparatus of claim 1, wherein the first packet and the third packet are data packets as transmitted in accordance with a WIFI standard.

8. The apparatus of claim 7, wherein the second packet is a beacon as transmitted in accordance with the WIFI standard.

9. An apparatus for generating a mosaic for a wireless communication system, the apparatus comprising:
   memory; and
   a server including the memory and being programmed to:
      receive first information from an associated access point that corresponds to an acknowledgment packet as received from a mobile device, the acknowledgment packet being transmitted by the mobile device in response to a data packet that is transmitted by the associated access point and the first information further corresponding to a receiver address field in the data packet that provides an identification of the mobile device for the associated access point to transmit the data packet thereto; and access the receiver address field to determine the identity of the mobile device after the acknowledgment packet is received from the mobile device at the associated access point.

10. The apparatus of claim 9, wherein the receiver address field is located in the data packet.

11. The apparatus of claim 9, wherein the associated access point is an entity that is selected by the mobile device that bridge all traffic with a distribution system.

12. The apparatus of claim 11, wherein the distribution system is a network that is outside bridged with a wireless local wireless network that the mobile associates with.

13. The apparatus of claim 9, wherein the server is further programmed to receive first information from an associated access point that is indicative of: (i) a first receiver time stamp that the associated access point received a first packet from a mobile device, and (ii) a second receiver time stamp that the associated access point received a second packet from a first access point.

14. The apparatus of claim 13, wherein the server is further programmed to determine a first difference between the first receiver time stamp and the second receiver time stamp to generate a first difference value.

15. The apparatus of claim 14, wherein the server is further programmed to:

receive second information from a first location receiver that is indicative of (i) a third receiver time stamp that the first location receiver received a third packet from the mobile device, and (ii) a fourth receiver time stamp that the first location receiver received the second packet from the first access point; and determine a second difference between the third receiver time stamp and the fourth receiver time stamp to generate a second difference value.

16. The apparatus of claim 15, wherein the server is further programmed to:

compare each of the first difference value and the second difference value to a predetermined receiver time error range; and determine that the first packet and the third packet as transmitted by the mobile device are the same in response to each of the first difference value and the second difference value being within the predetermined receiver time error range.

17. The apparatus of claim 9, wherein the server is further programmed to obtain Angle of Arrival (AoA) information from the first location receiver of a direction of the mobile device relative to an orientation of the first location receiver.

18. The apparatus of claim 17, wherein the server is further programmed to determine a location of the mobile device based at least on the AoA information as received from the first location receiver.

19. A method for generating a mosaic for a wireless communication system, the method comprising:

receiving, at a server, first information from an associated access point that is indicative of: (i) a first receiver time stamp that the associated access point received a first packet from a mobile device, and (ii) a second receiver time stamp that the associated access point received a second packet from a first access point;

determining a first difference between the first receiver time stamp and the second receiver time stamp to generate a first difference value;

receiving second information from a first location receiver that is indicative of (i) a third receiver time stamp that the first location receiver received a third packet from the mobile device, and (ii) a fourth receiver time stamp that the first location receiver received the second packet from the first access point;

determining a second difference between the third receiver time stamp and the fourth receiver time stamp to generate a second difference value;

comparing each of the first difference value and the second difference value to a predetermined receiver time error range; and determining that the first packet and the third packet as transmitted by the mobile device are the same in response to each of the first difference value and the second difference value being within the predetermined receiver time error range.

20. A method for generating a mosaic for a wireless communication system, the method comprising:

receiving, at a first server, first information from an associated access point that corresponds to an acknowledgment packet as received from a mobile device, the acknowledgment packet being transmitted by the mobile device in response to a data packet that is transmitted by the associated access point and the first information further corresponding to a receiver address field in the data packet that provides an identification of the mobile device for the associated access point to transmit the data packet thereto; and accessing the receiver address field to determine the identity of the mobile device after the acknowledgment packet is received from the mobile device at the associated access point.

* * * * *